United States Patent [19]

Winter

[11] E Re. 30,931

[45] Reissued May 18, 1982

[54] WARP KNITTING MACHINE WITH COMPOUND NEEDLES

[76] Inventor: Karl Winter, Platanenstrasse 6, D6053 Obertshausen, Fed. Rep. of Germany

[21] Appl. No.: 253,042

[22] Filed: Apr. 10, 1981

Related U.S. Patent Documents

Reissue of:

[64] Patent No.: 4,222,249
Issued: Sep. 16, 1980
Appl. No.: 27,372
Filed: Apr. 5, 1979

[30] Foreign Application Priority Data

Apr. 10, 1978 [DE] Fed. Rep. of Germany ..... 2815385

[51] Int. Cl.[3] ..... D04B 35/04

[52] U.S. Cl. ..... 66/120

[58] Field of Search ..... 66/116, 120, 123

[56] References Cited

U.S. PATENT DOCUMENTS

| | | | |
|---|---|---|---|
| 3,828,582 | 8/1974 | Widdowson et al. | 66/120 |
| 3,952,551 | 4/1976 | Kohl | 66/120 |
| 4,109,490 | 8/1978 | Bosch | 66/120 |

*Primary Examiner*—Ronald Feldbaum
*Attorney, Agent, or Firm*—Omri M. Behr

[57] ABSTRACT

A minimum friction slider needle for use with warp knitting machines includes a shank having a slot provided therein. The bottom portion of the slot is provided with a raised portion which is the only portion of the shank that comes into contact with the slider member in operation.

20 Claims, 3 Drawing Figures

WARP KNITTING MACHINE WITH COMPOUND NEEDLES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to slider needles for use with warp knitting machines, and in particular, to a minimum friction slider needle for use therewith.

2. Description of the Prior Art

Conventional warp slider needles utilized with warp knitting machines must be replaced at relatively frequent intervals since they become worn out by the friction created between the slider portion of the needle and shank portions thereof. As is well known the slider portion of the needle comes into contact with the hooked or curved portion of the shank when the needle is closed and has additional pressure exerted thereon by the threads as each stitch is knocked off the needle. Many attempts have been made over the years to reduce the amount of friction looses and heat generated by these needles and the sharpening of the hook portion and tip of the slider portion as they continually brush against each other in operation.

An early attempt to overcome this disadvantage is shown in German Pat. No. 1,760,140 which discloses a slider needle wherein the slider portion thereof does not come into contact with any portion of the groove provided in the needle shank during its backwards and forwards motion (opening and closing of the needle mouth). It is to be noted that in such a machine the free end of the slider portion is under load during the knocking over of the stitch because of the tension on the stitch threads. Since there is play between the lower end of the slider portion and the groove in the shank the slider portion will be obliged to support itself or come into contact with the hooked portion of the shank. Generally, the knockover steps overlap in time with the end of the closing of the needle mouth by the slider portion and the effect of stitch tension causes the slider portion to come into intimate contact with the hook portion of the shank. The effects of friction therebetween eventually leads to a sharpening of both the end of the slider portion and the hooked portion of the needle shank which in turn may cause the cutting of threads passing therebetween.

Another slider needle for use with warp knitting machines is shown in U.S. Pat. No. 3,229,485 which discloses a slider needle with a section cut out of the lower side of the slider portion. With this type of arrangement the slider portion, in its closed position, covers the hooked portion of the needle shank with the free end of the slider portion. With this modification the lower edge of the slider portion slides along its whole length and during its forward and backward movement in the groove coming into contact therewith. Moreover, in the closing position (where the mouth of the hook is closed by the slider portion) the lower edge of the slider portion is supported in the groove at the end thereof proximate the hooked portion of the shank so that forces acting upon the slider portion are transmitted to the hooked portion of the needle in a limited manner. However, during the sliding movement (opening and closing of the needle mouth) friction occurs in the groove and thus grinding will occur therein.

SUMMARY OF THE INVENTION

The present invention overcomes the shortcomings found in the prior art by providing a slider needle for use with the warp knitting machines wherein the friction between the shank and hook portion of the needle and the slider portion of the needle is substantially reduced thereby increasing the life of the slider needle.

A minimum friction slider needle, according to the principles of the current invention, for use with warp knitting machines having at least one guide bar, a needle bar having a plurality of slider needles thereon, and cooperating driving means, includes the improvement wherein each slider needle comprises a shank having a hook formed end portion, the shank having a slot provided therein. The bottom portion of the slot is provided with a raised portion at the end thereof proximate the hook formed end portion. A slider member is disposed in the slot and cooperates therewith. One depressed end portion of the slider member extends from the shank across the mouth of the hook formed end portion of the shank and acts to cooperate and close the mouth of the hook formed end portion in a first position and acts to open the mouth of the hook formed end portion in a second position. The slider member has a remaining portion rearward of said depressed portion coming into contact with only the slot raised portion of the shank when the slider member is in its first position. The remaining portion of the slider member and the raised portion of the shank slot is the only contact area between the shank and the hook formed end portion thereof and the slider member. The other end portion of the slider member is adapted to be coupled to the driving means for movement from the first to the second position.

BRIEF DESCRIPTION OF THE DRAWINGS

In order that the invention may be more fully understood, it will now be described by way of example, with reference to the accompanying drawing in which.

DESCRIPTION OF THE PREFERRED EMBODIMENT

Figure 1:
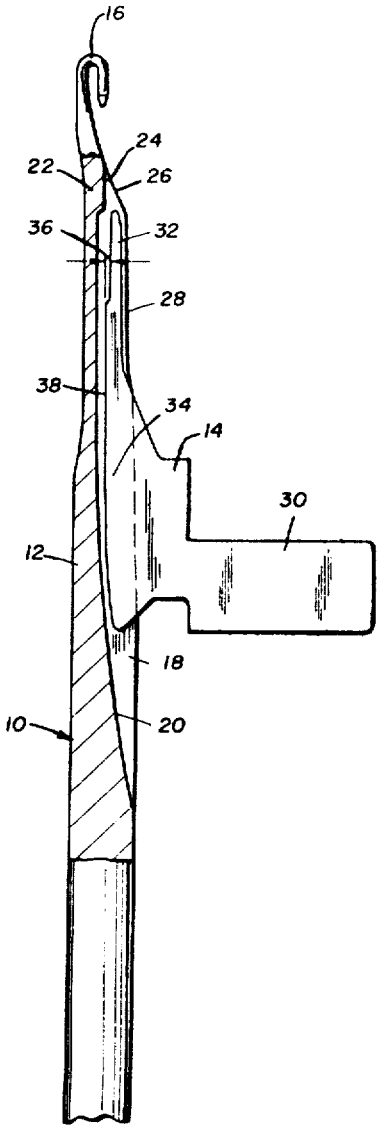
FIG. 1 is a pictorial representation of a slider needle, according to the principles of the present invention, in the open position.

Referring now to the drawing and in particular to FIG. 1, there is shown a slider needle 10 having a shank 12 and a slider member 14. The shank 12 includes a hook formed end portion 16. The shank 12 is provided with a slot 18 which extends along the longitudinal axis of the needle 10 proximate the hook formed end portion 16. The bottom portion 20 of the slot 18 is provided with a raised portion 22 proximate the hook formed end portion 16. The raised portion 22 is preferably provided with a relatively flat support surface 24. In the vicinity of the protrusion 22 the shank 12 is provided with an angled surface 26 which runs from the area of the hooked end portion to the main needle surface 28.

Figure 2:
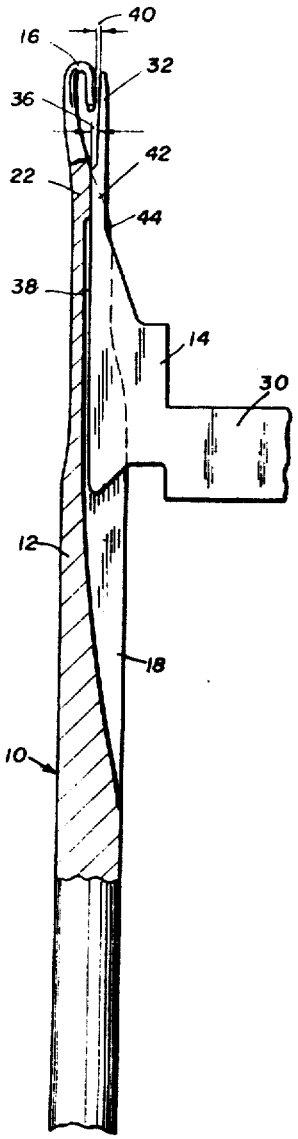
FIG. 2 is the slider needle shown in FIG. 1 in the closed position.
Figure 3:
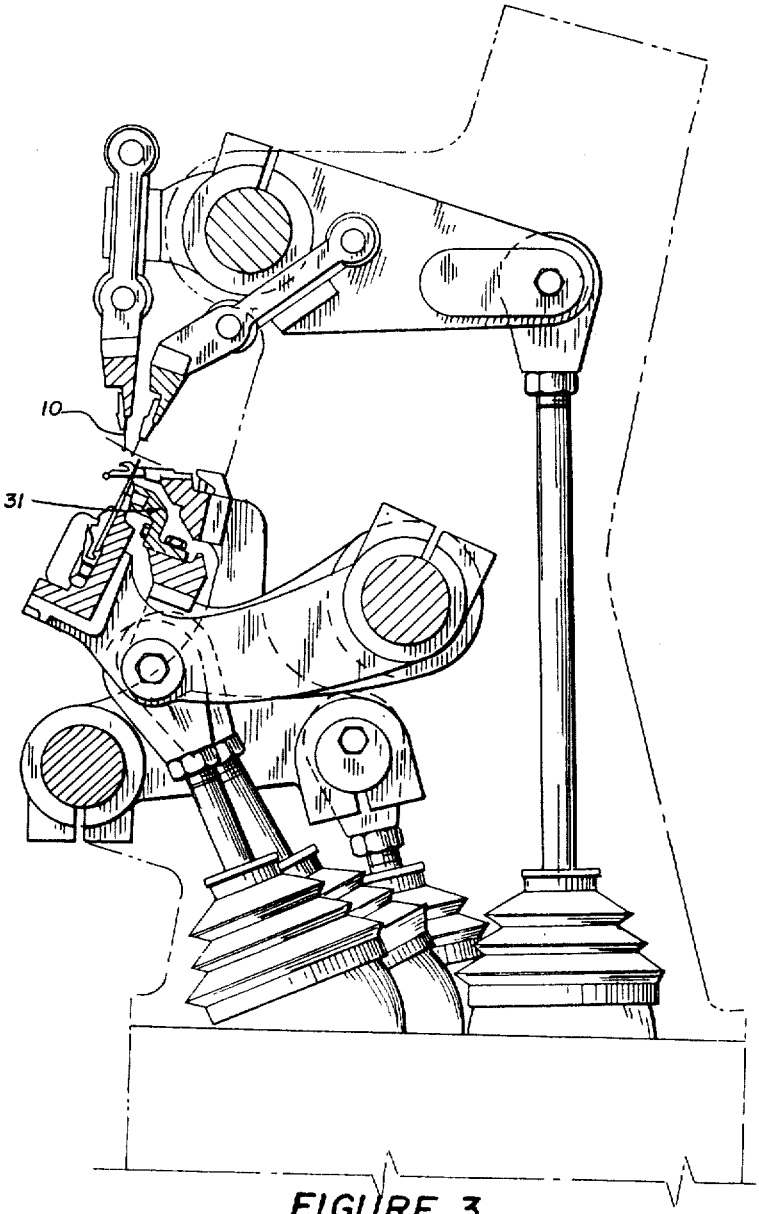
FIG. 3 is a pictorial representation of a portion of the drive mechanism of a conventional warp knitting machine utilizing slider needles.

The slider member 14 is provided with a shaft portion 30 which is adapted to be coupled to the source of driving power 31 as shown in FIG. 3, in a conventional manner. The distal free front end 32 of the slider member 14 and the remaining portions 34 are positioned in such a manner so that over a substantial portion of the movement of the slider member 14 in the slot 18 there is a certain amount of separation and therefore no frictional contact between the slider member 14 and the shank 12 in the open position as shown in FIG. 1. The front end 32 of the slider member 14 is provided with a cutout or depressed portion 36 on the lowermost or bottom edge 38 of the slider 14. The length of the depressed portion 36 is so chosen that when the slider member 14 is in its closed position, as shown in FIG. 2 it ends just prior to the raised portion 22.

The height of the raised portion 22 is chosen so that when the slider member is in its closed position as shown in FIG. 2, with the lower edge 38 thereof in intimate contact with the raised portion 22 by virtue of a thread, not shown, pressing against the front end 32 the slider 14 a small separation 40 remains between the free end of the slider 32 and the hook formed end portion 16 of the shank 12. Preferably, the height of the raised portion 22 plus the height of the slider remaining portion 42 resting on the raised portion 22 is smaller than the depth of the groove at portion 44 of shank 12 which is proximate the raised portion 22.

Thus, it can be seen that the depressed portion 36 is related to and cooperates with the raised portion 22 so that the depressed portion 36 ends just before the raised portion and during the contact of the lower edge 38 of the slider member 14 with the raised portion 22 the free end 32 of the slider member 14 is spaced away from the hook formed end portion 16 of the shank 12, thereby effectively placing no load on the hook formed end portion. Moreover, in accordance with the principles of the present invention, the raised portion 22 supports the free front end 32 of the slider member 14 during the knocking step of the stitch. The small amount of friction which occurs when the lowest edge 38 of slider 14 comes into contact with the raised portion 22 of the shank 12 minimizes the amount of wear that occurs on the shank 12 or slider member 14. Because of the present arrangement, the slider member and shank are relieved of substantially all load, thereby preventing the shank or hook shaped portion thereof to be ground to a sharp edge by frictional wear.

Preferably the length of the raised portion 22 of the shank 12 is approximately equal to the length that the slider free front end 32 overlaps the hook formed end portion 16 of the shank 12.

In operation, the lowest edge 38 of the slider member 14 comes into intimate contact with the raised portion 22 of the shank 12 only in the closed position as shown in FIG. 2. The slider position shown in FIG. 2 occurs just as the stitches already occurring on the needle shaft are to be knocked over. Since all the forces generated by the threads and contact between the slider member 14 and the shank 12 occur at the raised portion 22 there is no other wear point between the shank and slider member.

Hereinbefore, has been disclosed a minimum friction slider needle for use with warp knitting machines. The slider needle as disclosed has extended life since the wear portions have been reduced to a minimum. It will be understood that various changes in the details, materials, arrangements of parts and operating conditions which have been herein described and illustrated in order to explain the nature of the invention may be made by those skilled in the art within the principles and scope of the present invention.

Having thus set forth the nature of the invention what is claimed is:

1. In a warp knitting machine having at least one guide bar, a needle bar having a plurality of slider needles thereon, and cooperating driving means, wherein each said slider needle comprises:

(a) a shank having a hook formed end portion, said shank having a slot provided therein, the bottom of said slot being provided with a raised portion at the end thereof proximate said hook formed end portion;

(b) a slider member disposed in said slot and slidably cooperating therewith, said slider member being driven by said driving means; and (i) having one depressed end portion thereof extending from said shank across the mouth of said hook formed end portion of said shank acting to cooperate with and close said mouth in a first position and acting to open said mouth in a second position; and (ii) having a remaining portion rearward of said depressed portion coming into contact with only said slot raised portion of the shank when said slider member is in its first position, said remaining portion and said raised portion being the only contact area between said shank and the hook formed end portion thereof and said slider member, the other end portion of said slider member being adapted to be coupled to said driving means for movement from said first to said second position.

2. A warp knitting machine according to claim 1 wherein said one end portion of said slider member is displaced from said hook formed end portion of said shank when said slider member is in said first position.

3. A warp knitting machine according to claim 1 wherein the sum of the dimensions of the raised bottom portion of said shank and the remaining portion of said slider, proximate the depressed portion of said slider member, is less than the dimensions of said shank member proximate said raised bottom portion when said slider member is in said first and second positions.

4. A warp knitting machine according to claim 1 wherein the raised bottom portion of said shank slot is provided with a flat supporting surface.

5. A warp knitting machine according to claim 1 wherein said slider member is displaced from the bottom of said slot and said raised portion of said shank slot in said second position.

6. A warp knitting machine according to claim 1 wherein the length of said shank slot raised portion is approximately equal to the length that said slider member one end portion overlaps said hook formed end portion of said slider needle shank.

7. A warp knitting machine according to claim 1 wherein said slider member and said needle shank are driven in essentially straight paths.

8. A warp knitting machine according to claim 1 wherein said slider member and said needle shank are driven in essentially circular paths.

9. A warp knitting machine according to claim 1 wherein said slider member and said needle shank are driven in parallel paths.

10. A slider needle comprising:

(a) a shank having a hook formed end portion, said shank having a slot provided therein, the bottom of said slot being provided with a raised portion at the end thereof proximate said hook formed end portion;

(b) a slider member disposed in said slot and slidably cooperating therewith; and (i) having one depressed end portion thereof extending from said shank across the mouth of said hook formed end portion of said shank acting to cooperate with and close said mouth in a first position and acting to open said mouth in a second position; and (ii) having a remaining portion rearward of said depressed portion coming into contact with only said slot raised portion of the shank when said slider member is in its first position, said remaining portion and said raised portion being the only contact area between said shank and the hook formed end portion thereof and said slider member, the other end portion of said slider member being adapted to be coupled to a driving means for movement from said first to said second position.

11. A slider needle according to claim 10 wherein said one end portion of said slider member is displaced from said hook formed end portion of said shank when said slider member is in said first position.

12. A slider needle according to claim 10 wherein the sum of the dimensions of the raised bottom portion of said shank and the remaining portion of said slider, proximate the depressed portion of said slider member, is less than the dimensions of said shank member proximate said raised bottom portion when said slider member is in said first and second positions.

13. A slider needle according to claim 10 wherein the raised bottom portion of said shank slot is provided with a flat supporting surface.

14. A slider needle according to claim 10 wherein the length of said shank slot raised portion is approximately equal to the length that said slider member one end portion overlaps said hook formed end portion of said slider needle shank.

15. A slider needle according to claim 10 wherein said slider member and said needle shank are adapted to move in essentially straight paths.

16. A slider needle according to claim 10 wherein said slider member and said needle shank are adapted to move in essentially circular paths.

17. A slider needle according to claim 10 wherein said slider member and said needle shank are adapted to move in parallel paths.

*18. A shank member for a slider needle, comprising a hook formed end portion and a shank portion, said shank portion having a slot provided therein, the bottom of said slot being provided with a raised portion at the end thereof proximate said hook formed end portion, said raised portion being the only portion to come into contact with a slider member adapted to cooperate therewith.*

*19. A shank member in accordance with claim 18 wherein the raised bottom portion of said shank portion slot is provided with a flat supporting surface.*

*20. A slider member for a slider needle having a shank member provided with a hook formed end portion and a shank portion having a slot provided therein with a raised portion, said slider member being adapted to be slidably disposed in said slot and cooperate therewith, including;*

*(i) one depressed end portion thereof extendable from said shank portion across the mouth of said hooked formed end portion of said shank member to cooperate with and close said mouth in a first portion and open said mouth in a second position and,*

*(ii) a remaining portion rearward of said depressed portion for coming into contact with only the slot raised portion of said shank portion when said slider member is in its first position, said remaining portion and said raised portion being the only contacting area between said shank member and the hook formed end portion thereof and said slider member, the other end portion of said slider member being adapted to be coupled to a driving means for movement from said first to said second position.*

* * * * *